March 31, 1942.    R. C. ALLEN    2,278,040
TURBINE BLADING
Filed Oct. 23, 1939
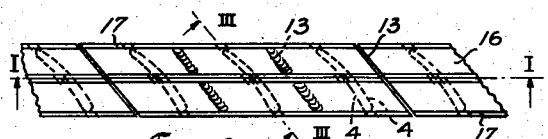
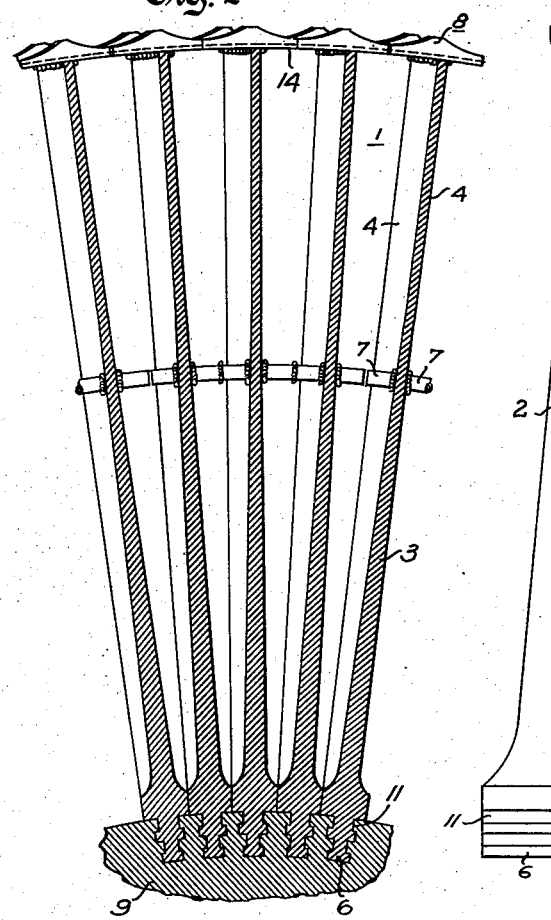
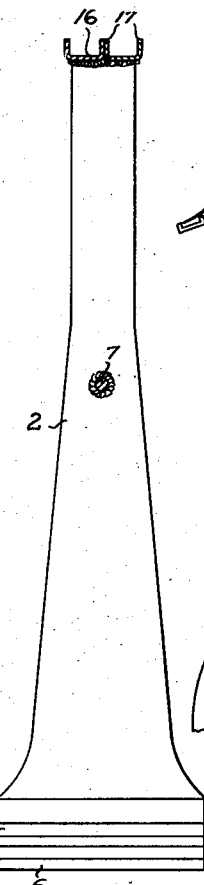
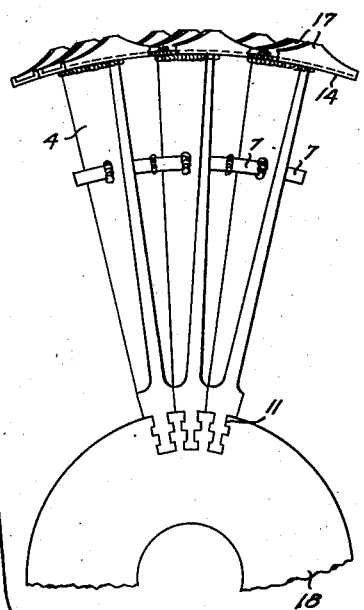
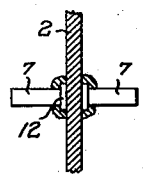
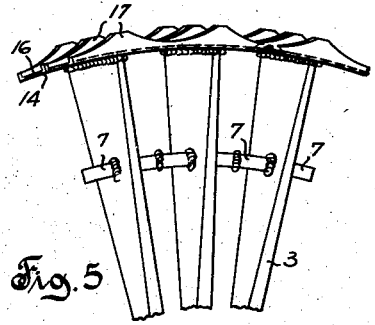
Inventor
R. C. Allen
by
Attorney Patented Mar. 31, 1942

2,278,040

UNITED STATES PATENT OFFICE 2,278,040

TURBINE BLADING

Robert C. Allen, Wauwatosa, Wis., assignor to Allis-Chalmers Manufacturing Company, Milwaukee, Wis., a corporation of Delaware Application October 23, 1939, Serial No. 300,708

7 Claims. (Cl. 29—156.8)

This invention relates to turbine blading and more particularly to the shrouding and lashing means and to the assembly of blading, shrouding and lashing.

The particular shroud structure herein shown and described is fully disclosed and claimed in my copending divisional application, Serial No. 354,048, filed August 24, 1940.

Turbines designed for maximum efficiency generally employ one or more circumferential blade rows of low pressure blading in which the radial length of the individual blades is considerably greater than their axial width. Consequently, the obtainment of a stable structure necessitates the use of bracing members (lashing and/or shrouding means) in order to reinforce the blades and to thereby reduce the bending stresses and increase the natural frequency of vibration. Heretofore these bracing members have been fastened by riveting or upsetting or by such processes as silver soldering and brazing. Arc welding has also been used to a limited degree.

Attachment of the bracing members to the blades by riveting or upsetting is objectionable in that either the blades must be punched or drilled to receive the rivets and lashing members which in turn weakens the blade or the blade must be formed with lugs or protuberances which complicates and makes for a more costly process of manufacture. In addition, fastenings of this nature soon become loose due to unequal expansion, elastic stretch and/or creep of the blade and bracing materials. Attachment of the bracing members to the blades and to one another by silver soldering or brazing and by arc welding as hitherto practiced is also objectionable in that the adjacent portions of the blade are heated sufficiently to change the physical properties of the blade material and to set up local stresses which in many instances have caused the bracing members and/or the blades to fail.

The corrosive action of the driving fluid usually necessitates the use of stainless steels for both the blade and bracing members. Stainless steels having the requisite physical properties for blade construction such, for example, as the 12% chrome steels commonly used are subject to air hardening and as a result it is practically impossible to arc weld such steels and obtain a ductile and reliable bond between adjacent bracing members and between the bracing members and the blades. Therefore, in addition to setting up local stresses in the blade material adjacent the weld as pointed out in the preceding paragraph, the arc welding of the bracing members to one another and to the blades produces extremely brittle bonds which are incapable of withstanding the stresses to which they are subjected.

The bending stresses set up in the shroud members by centrifugal force become excessive at relatively high rotative speeds and as a result the types of shrouding hitherto used frequently fail when the tip speed of the blades approaches or exceeds 1100 feet per second. The adjacent edges of the individual shrouds or of the shroud strips, where strips of shrouding of sufficient length to span several blades are used, are usually secured together by a soldered, brazed or welded bond, and due to the nature of this bond and, in those structures in which the individual shrouds or strips are secured to the blades by riveting or upsetting, to looseness between the shroud members and blades, the bond between adjacent shroud members usually fails first. Damage to the turbine is, in many instances, attributable to the failure of the bond between adjacent shroud members and to the action of centrifugal force in bending the then free ends of the shrouds radially outward, thereby causing the soldered, brazed or welded bond between the shroud member and blade to fail or the free end of the shroud to contact a stationary part of the machine.

The difficulties heretofore mentioned are also experienced in those structures in which the free ends of the individual shrouds or of the shroud strips are not secured together. Attempts to overcome the aforementioned difficulty by using shroud strips channel shaped in cross-section and of sufficient length to span several blades and by increasing the radial thickness of shroud material have not been successful in that the shrouds buckle or otherwise distort sufficiently to contact a stationary part of the turbine or if the radial thickness is increased sufficiently to prevent distortion, the increased mass results in a large centrifugal moment which causes destructive bending and breaking of the shroud adjacent its point of connection to the blade.

It is accordingly an object of this invention to provide an improved method and means of bracing turbine blades which will entirely eliminate the deleterious effects of air hardening of the blade and bonding materials incidental to welding and which will produce a ductile and reliable bond between adjacent bracing members and the bracing members and blades.

Another object of this invention is to provide an improved method of lashing blades in a circumferential blade row which will not alter the desired physical properties of the blade and lashing materials and which will produce ductile and reliable bonds between adjacent lashing members and between the lashing members and blades.

A further object of this invention is to provide an improved method of shrouding the blades in a circumferential blade row which will not alter the desired physical properties of the blade and shroud materials and which will produce ductile and reliable bonds between adjacent shrouds and between the shrouds and blades.

The invention accordingly consists of the various methods and features of construction, combinations of elements and arrangements of parts as more fully pointed out in the appended claims and in the detailed description, in which:

Fig. 1 is a vertical section taken on line I—I of Fig. 2, illustrating a portion of a circumferential blade row embodying the invention;

Fig. 2 is a plan view of the portion of the circumferential blade row illustrated in Fig. 1;

Fig. 3 is a vertical section taken on line III—III of Fig. 2;

Fig. 4 illustrates a segmental blade group mounted in a jig adapted to hold the blades in their proper cooperative relationship;

Fig. 5 is a view of a portion of a circumferential blade row illustrating a modification in the shroud structure; and Fig. 6 is a detail of the lashing means.

The invention, reference being had to the drawing, is shown as applied to a circumferential row of low pressure reaction blading of which only a portion of the blade row is shown in the interest of simplicity. The blade row 1 is formed by blade structures 2 each having a body portion 3 presenting oppositely disposed fluid confining surfaces 4, a depending serrated root portion 6, lashing members 7 which are welded to oppositely disposed portions of the fluid confining surfaces 4, and a shroud member 8 which is welded to the top of the body portion 3. The blade structures 2 are secured in the turbine spindle or rotor 9 by means of a circumferential row of axially extending blade retaining grooves 11, the cross-sectional configuration of which conforms with that of the root portions 6. The blades per se, which include the body and root portions 3 and 6, respectively, are shaped from a highly corrosive and erosive resistant material which is subject to air hardening incidental to the welding of the bracing members (the shrouding and/or the lashing means) thereto. A 12% chrome steel containing about 0.12% carbon is admirably suited for this use, but it should be understood that any other material having the desired physical properties may be used. This manner of securing blade structures to a turbine spindle or rotor is old and well known and in this connection it should be borne in mind that the particular blade retaining means employed forms no part of this invention and is merely illustrative of a commercially practical construction.

The lashing members 7, particular reference being had to Figs. 3 and 6, are generally circular in cross-section and have a circular enlargement 12 at one end to facilitate the welding of the members 7 to the fluid confining surfaces 4 of the body portion 3. The particular cross-sectional configuration of the lashing members employed is not an important feature as the invention contemplates the use of members having any desired form or shape. However, the important feature is that the members are shaped from a non-air hardening material such as the 18–8 chrome-nickel steel (18% chromium, 8% nickel) commonly used in the construction of fluid turbine blading. The lashing members are welded to the fluid confining surfaces 4 preferably with a weld material which produces a ductile bond and is not subject to air hardening when heated incidental to the welding operation. A 25–12 chrome-nickel weld material (25% chromium, 12% nickel) possesses the essential quality mentioned above. However, the use of a non-air hardening steel weld material for this particular welding operation is not essential although its use does produce better results.

The individual shroud members 8, which are also shaped from a non-air hardening material such as the 18–8 chrome-nickel steel used for the lashing members 7, each have oppositely disposed ends or edges 13, a substantially smooth bottom surface 14, a top surface 16 provided with a plurality (preferably three) of upstanding and approximately parallelly extending spaced flanges 17. The height of each of said flanges is a maximum approximately midway between said oppositely disposed ends or edges and progressively decreases toward each of said edges. The members 8 are so dimensioned that when such a member is secured to the top of a blade with the blade top coacting with the portion of the member approximately midway between said opposite edges and blades provided with these members are assembled in their proper cooperative relationship to form a circumferential blade row, said flanges extend circumferentially of and radially outward with respect to said row, said opposite ends or edges on the members on adjacent blades are disposed in welding proximity, and said bottom surfaces on adjacent members provide in effect a continuous fluid confining surface. The underside of the individual shroud members is welded to the tops of the individual blades, as shown in Figs. 1, 3 and 4, using a non-air hardening weld material such as that set forth in connection with the welding of the lashing members 7 to the fluid confining surfaces 4.

The shroud members 8 are preferably formed in two complimentary parts by a stamping operation and these parts are tack welded or otherwise secured together to form the unitary shroud structure illustrated. This construction provides in effect a double central flange as best shown in Fig. 3 which greatly reduces the stresses set up by the centrifugal bending moment. However, a feature of much greater importance is the cantilever bridge configuration of the flanges 17 when seen in side elevation as this construction greatly reduces the mass of the unsupported portions of the shroud members which materially decreases the bending moment produced by centrifugal force and permits the use of flanges having sufficient strength to resist the centrifugal bending moment. Shroud members having the characterizing features previously described can obviously be formed or shaped in numerous ways different from the described stamping and welding operation which merely illustrates one practical mode of construction.

The blade structures 2 are formed by placing the blade per se in a suitable jig or other means operative to hold the blade in a position permitting the bracing means (the shroud and/or the lashing means) to be held in their proper cooperative relationship with respect to the blade. The bracing means is then welded to the blade preferably using a non-air hardening weld material as previously described. If both lashing and shrouding members are to be welded to the blade, to form the type of blade structure illustrated in the drawing, it is preferable, although not necessary, to first weld the lashing members 7 to the fluid confining surfaces 4. A suitable means for holding the blades so that the bracing means can be welded thereto as described will be obvious to any one skilled in the art and a detailed disclosure of a suitable means for this purpose is not deemed essential for a complete understanding of this invention.

The blade structures thus formed which consist of the blade proper shaped from a highly corrosive and erosive resistant material, preferably a stainless steel, which is subject to air hardening incidental to the welding of the bracing means thereto and the bracing means shaped from a non-air hardening material, a steel such as disclosed being preferable, are then annealed at approximately 1125° F. or quenched from 1750° F. and then annealed at 1125° F. to eliminate the effects of air hardening thereby producing a ductile and reliable bond between the bracing means and the blade proper. The blade structures are then assembled in their proper cooperative relationship on a turbine spindle or rotor to form a circumferential blade row with the edges of the shroud members and the free ends of the lashing members on adjacent blades disposed in welding proximity. The edges of the shroud members 8 and the free ends of the lashing members 7 on adjacent blades are then welded together using a 25-12 chrome-nickel steel weld material, which is non-air hardening, to produce a ductile and reliable bond between the bracing means on adjacent blades. In this connection, a more stable structure has been obtained by welding together the bracing means on a predetermined number of blades rather than by welding together the bracing means on all of the blades forming the circumferential blade row. This construction is clearly illustrated in Fig. 2 in which the blade structures are welded together in groups of three.

Instead of assembling the individual blade structures on a turbine spindle or rotor to form a circumferential blade row prior to the welding together of the bracing means on the groups of blade structures, a plurality of these blade structures, which have been formed and heat treated as previously described, may be assembled in their proper cooperative relationship and the edges and/or the free ends of the bracing means on adjacent blades welded together with a non-air hardening steel weld material to form a segmental blade group adapted to be mounted as a unit on a turbine spindle or rotor to form a portion of a circumferential blade row. Fig. 4 illustrates a jig 18 provided with a plurality of identical grooves 11 conforming in shape, size and arrangement to the blade retaining grooves 11 in the turbine rotor 9 so as to retain the blade structures mounted thereon in the same cooperative relationship that exists when the blade structures are mounted on the turbine rotor to form a circumferential blade row. Obviously the jig 18 may be provided with a different number of grooves than that shown or an entirely different type of jig can be employed if it is so desired. The only essential in this respect is that a jig be provided which is operative to hold a plurality of the heat treated blade structures in their proper cooperative relationship so that the proximate portions of the bracing means on adjacent blades can be welded together to form a segmental blade group. The segmental blade group thus formed is then removed from the jig and mounted on the turbine rotor to form a portion of a circumferential blade row. The manner of mounting segmental blade groups on a turbine rotor having axially extending retaining grooves is well known in the art as is also various forms of jigs for holding a plurality of blade structures in their proper cooperative relationship. Consequently, a more detailed disclosure in this respect is deemed unnecessary for a complete understanding of the invention.

Fig. 5 illustrates a modified construction in that the shroud members 8 are made of sufficient length to span only two blades and the height of the flanges 17, which is a minimum at the opposite ends of the shroud member, progressively increases to a maximum and then decreases to a minimum throughout successive circumferentially extending portions each of which is approximately equal to one-half the tip pitch of the blades the shroud member is adapted to span. These flanges also provide a cantilever bridge type construction, when viewed in side elevation, which is similar in appearance to that provided by two of the adjacent blade structures seen in Figs. 1 and 4. The procedure to be followed in connection with this embodiment of the invention is to first attach the lashing members 7 to the fluid confining surfaces 4 as described in connection with Figs. 1, 2, 3 and 6, then to assemble the blade structures thus formed in their proper cooperative relationship in the jig 18 shown in Fig. 4, then either first weld the free ends of the lashing members together or first place and hold the shroud member 8 on the tops of the blades so that the blade tops coact with those portions of the underside of the shroud member lying beneath the points at which the height of the flanges 17 is maximum and weld the shroud member to the tops of the blades, then remove the unitary blade group thus formed from the jig and heat treat the group to eliminate the effects of air hardening incidental to welding, then mount the unitary blade group on the turbine rotor to form a portion of a circumferential blade row, and then weld together the free ends of the shroud and lashing members on two or more adjacent groups with a non-air hardening steel weld material to form a circumferential blade row having a plurality of reinforced segmental blade groups consisting of two or more of the unitary blade groups formed in said jig. If desired the shroud member 8 can be readily made of sufficient length to span three or more blades which, of course, would necessitate that the unitary blade groups be formed by using a corresponding greater number of blades.

The invention broadly contemplates the formation of a blade structure embodying a blade shaped from a material which is subject to air hardening when heated incidental to the welding of a part thereon and a bracing means which is shaped from a non-air hardening material and which is welded to the blade. The invention broadly contemplates the formation of a reinforced blade assembly in which the proximate portions of the non-air hardening bracing means on adjacent blade structures or groups of blade structures are welded together with a non-air hardening weld material either before or after the individual blade structures or groups are mounted on a turbine rotor to form a circumferential blade row. The term "bracing means" is herein used as a generic term to include all forms of lashing and shrouding means whether considered separately or in combination and in this connection, it should be understood that it is not desired to limit the invention to the exact details of operation and construction herein shown and described as various modifications within the scope of the claims may occur to persons skilled in the art.

It is claimed and desired to secure by Letters Patent:

1. The method of forming a reinforced blade row for a turbine element with blades formed of a material that normally air hardens when heated incidental to the welding of a part thereto which comprises welding bracing means formed of a non-air hardening material to the individual blades in a manner inducing air hardening in the portion of the blade immediately adjacent the weld and so as to form unitary blade structures each having said means projecting so as to present free end portions so arranged that when the blade structures are mounted on a turbine element to form a blade row the free end portions of the said means on each blade structure are disposed in welding proximity with respect to the free end portions of the bracing means on the next adjacent blade structures, heat treating said unitary blade structures to eliminate the effects of air hardening of portions of the individual blades incidental to the welding of the bracing means thereto, mounting said heat treated unitary blade structures on a turbine element to form a blade row, and uniting the free end portions of the bracing members on a series of adjacent blade structures through non-air hardening material welded to said bracing means.

2. The method of forming a reinforced blade row for a turbine element with segmental blade groups each having blades formed of a material that normally air hardens when heated incidental to the welding of a part thereto which comprises welding bracing means formed of non-air hardening material to the individual blades constituting a blade group in a manner inducing air hardening in the portions of the blades immediately adjacent the welds and so as to form segmental blade groups each having bracing means projecting so as to present free end portions so arranged that when the blade groups are mounted on a turbine element to form a blade row the free end portions of the bracing means on one blade group are disposed in welding proximity with respect to the free end portions of the bracing means on the next adjacent blade groups, heat treating said blade groups to eliminate the effects of air hardening incidental to the welding of the bracing means thereto, mounting said heat treated blade groups on a turbine element to form a blade row, and uniting the free end portions of the bracing means on a series of adjacent blade groups through non-air hardening material welded to said bracing means.

3. The method of forming a reinforced blade row for a turbine element with blades formed of a material that normally air hardens when heated incidental to the welding of a part thereon which comprises welding an individual lashing member formed of a non-air hardening material to each of the oppositely disposed faces of the individual blades in a manner inducing air hardening in the portion of the blades immediately adjacent the weld and so as to form unitary blade structures each having oppositely extending lashing members presenting free end portions so arranged and of such length that when the unitary blade structures are mounted on a turbine element to form a blade row the free end portions of the lashing members on adjacent blade structures are disposed in welding proximity, heat treating the said unitary blade structures to eliminate the effects of air hardening of portions of the individual blades incidental to the welding of the lashing members thereon, mounting said heat treated unitary blade structures on a turbine element to form a blade row, and uniting the free end portions of the lashing members on a series of adjacent blade structures through non-air hardening material welded to said lashing members.

4. The method of forming a reinforced blade row for a turbine element with blades formed of a material that normally air hardens when heated incidental to the welding of a part thereto which comprises welding an individual shroud member formed of non-air hardening material to the tip of each blade in a manner to induce air hardening in the portion of the blade immediately adjacent the weld and so as to form unitary blade structures each having a shroud member presenting free end portions so arranged and of such length that when the blades are mounted on a turbine element to form a blade row the free end portions of the shroud members on adjacent blade structures are disposed in welding proximity, heat treating said unitary blade structures to eliminate the effects of air hardening of portions of the individual blades incidental to the welding of the shroud members thereto, mounting said heat treated unitary blade structures on a turbine element to form a blade row, and uniting the free end portions of the shroud members on a series of adjacent blade structures through non-air hardening material welded to said shroud members.

5. A blade structure comprising a blade formed of an air hardening material, and bracing means formed of non-air hardening material welded to said blade under conditions inducing air hardening in the portion of the blade adjacent the bracing means, said bracing means presenting projecting free end portions adapted to extend in welding proximity with respect to the free end portions of the bracing means on similar unitary blade structures when in their proper cooperative blade row forming relation, and said unitary blade structure being heat treated to eliminate the effects of air hardening of said blades incidental to the welding of the bracing means thereto.

6. A reinforced segmental blade group comprising a plurality of blades formed of an air hardening material, and bracing means formed of non-air hardening material and welded to each of said blades under conditions inducing air hardening in portions of the blades immediately adjacent the welds, and said segmental blade group being heat treated to eliminate the effects of air hardening of said blades incident to the welding of the bracing means thereto.

7. A reinforced blade assembly comprising a plurality of unitary blade structures each of which includes a blade formed of an air hardening material, bracing means formed of a non-air hardening material welded to said blade in a manner inducing air hardening in the portion of the blade immediately adjacent the weld, said bracing means presenting projecting free end portions, said unitary blade structures being heat treated to eliminate the effects of air hardening incidental to the welding of the bracing means thereto, said unitary blade structures being secured in their proper cooperative blade row forming relation with the free end portions of the bracing means on adjacent blade structures disposed in welding proximity, and a non-air hardening weld uniting the free end portions of the bracing means on a series of adjacent blade structures.

ROBERT C. ALLEN.